United States Patent

Chen et al.

[19]

[11] Patent Number: 5,926,290
[45] Date of Patent: Jul. 20, 1999

[54] DOCUMENT-TRAY-DRIVEN APPARATUS FOR A PHOTO DRIVE

[75] Inventors: Donald Chen, Pin Chen; Jenn-Tsair Tsai, Taoyuan Hsien, both of Taiwan

[73] Assignee: Mustek Systems, Inc., Hsinchu, Taiwan

[21] Appl. No.: 08/757,103

[22] Filed: Dec. 2, 1996

[51] Int. Cl.[6] ................................................. H04N 1/04
[52] U.S. Cl. ......................... 358/496; 358/487; 358/474; 358/498
[58] Field of Search .................................. 358/496, 498, 358/474, 471, 475, 505, 487, 488; 250/234, 235, 236, 208.1; 271/272, 273; 399/16, 17; H04N 1/04

[56] References Cited

U.S. PATENT DOCUMENTS

| | | | |
|---|---|---|---|
| 5,608,537 | 3/1997 | Manabe et al. | 358/487 |
| 5,663,812 | 9/1997 | Pan | 358/474 |
| 5,663,813 | 9/1997 | Pan | 358/496 |
| 5,673,125 | 9/1997 | Merecki et al. | 358/496 |
| 5,677,777 | 10/1997 | Tsai | 358/498 |
| 5,684,610 | 11/1997 | Brandestini et al. | 358/487 |
| 5,693,937 | 12/1997 | Tsai | 358/475 |
| 5,742,407 | 4/1998 | Albrecht et al. | 358/496 |
| 5,818,611 | 10/1998 | Shih | 358/474 |

*Primary Examiner*—Edward L. Coles
*Assistant Examiner*—Cheukfan Lee
*Attorney, Agent, or Firm*—Hayes, Soloway, Hennessey, Grossman & Hage, PC

[57] ABSTRACT

The invention relates to a document-tray driven apparatus for a photo drive for reading information off a transparent sheet or a reflective sheet. The invention mainly comprises a paper feeding device, a driving device, a lower illumination device, an upper illumination device and a photoelectric converting device. The exposure of the original sheet depends on the motion of the paper feeding device. As the paper feeding device is moving, the scanning process takes place simultaneously. This design allows all other optical members to fix on the housing. Thus, it makes the light path easier to control and the quality of the image scanned will be improved thereby. Moreover, since the driving device is installed at a single side of the housing, the space inside the housing can be utilized more efficiently.

16 Claims, 2 Drawing Sheets

DOCUMENT-TRAY-DRIVEN APPARATUS FOR A PHOTO DRIVE

BACKGROUND OF THE INVENTION

A. Field of the Invention

The invention relates to a photo drive which can be slid into any standard PC 5.25" bay and integrated with a personal computer, especially to a document-tray-driven photo drive which can scan a transparent sheet as well as a reflective sheet.

B. Description of the Prior Art

The recent development of scanner technology can shrink the size of a flatbed scanner to the size of a conventional CD-ROM driver. The compact scanner is called "photo drive" which can be slid into any standard PC 5.25" bay and integrated with a personal computer. Due to the size restriction, the main issue for the design and manufacture of the photo drive is how to simplify its inner structure without sacrificing its functions.

Currently the photo drive available on the market is paper-driven. Refer to FIG. 1, the illuminating device 101 and photoelectric converting device 102 are both fixed. When scanning, an original sheet is slipped into the opening between the upper paper guide 103 and the lower paper guide 104. When the pulleys 105 rotate and touch the original sheet, the original sheet will be automatically guided into the housing. The process of scanning begins as soon as the original sheet is fed in. The window 106 on the lower paper guide 104 allows the light beams from the illuminating device 101 to emit through. The light beams shone on the original sheet will then be reflected to photoelectric converting device 102 via mirror 107. When the exposure is finished, the pulleys 105 will guide the original sheet out.

In addition to the complexity of its structure, the design of the paper-driven structure has several disadvantages. First, when the original sheet is guided by the pulleys 105, the surface of the original sheet is likely to be scratched by the pulleys 105. It causes paper dust to fall on the window 106 or mirror 107. The contamination on the window 106 or mirror 107 will influence the clarity of the images. Moreover, the friction factors between the pulleys 105 and the original sheet are hard to control. If the friction factors are too small, the pulleys 105 are not able to roll the original sheet into the housing. If they are too large, the pulleys 105 will scratch the surface of the original sheet and generate paper dust. Furthermore, the design of the paper guides is too complicated and not practical in application. It cannot guarantee that the original sheet will be guided smoothly into the housing. If the original sheet is not guided properly, the image of the original sheet will be screwed up.

SUMMARY OF THE INVENTION

Accordingly, it is an object of the present invention to provide a document-tray-driven apparatus which can simplify the inner structure of a photo drive, stabilize its light path and improve the quality of the images scanned thereby.

It is another object of the present invention to provide a simple document-tray-driven apparatus for a photo drive which is capable of scanning a reflective sheet as well as a transparent sheet.

It is a further object of the present invention to provide a document-tray-driven apparatus which is easy to assemble and maintain so as to save the manufacture cost and maintenance fee.

These and other objects of the invention, which will become more apparent as the invention is described more fully below, are obtained by providing a document-tray-driven apparatus which includes a paper feeding device, a driving device, a lower illuminating device, an upper illuminating device, and a photoelectric converting device. The paper feeding device is in the middle of a compact housing. The upper illuminating device and the lower illuminating device are attached respectively to the upper half and the lower half of the front end of the housing. They provide the light sources for a reflective sheet as well as a transparent sheet. The exposure of the original sheet depends on the motion of the paper feeding device. The photoelectric converting device is fixed on the bottom of the housing for converting the image information of the original sheet into electric signals. Since the main optical members are fixed on the housing, the light path is easier to control and the quality of the image scanned will be improved thereby. Moreover, since the driving device is installed at a single side of the housing, the space inside the housing can be more efficiently utilized.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

Figure 1:
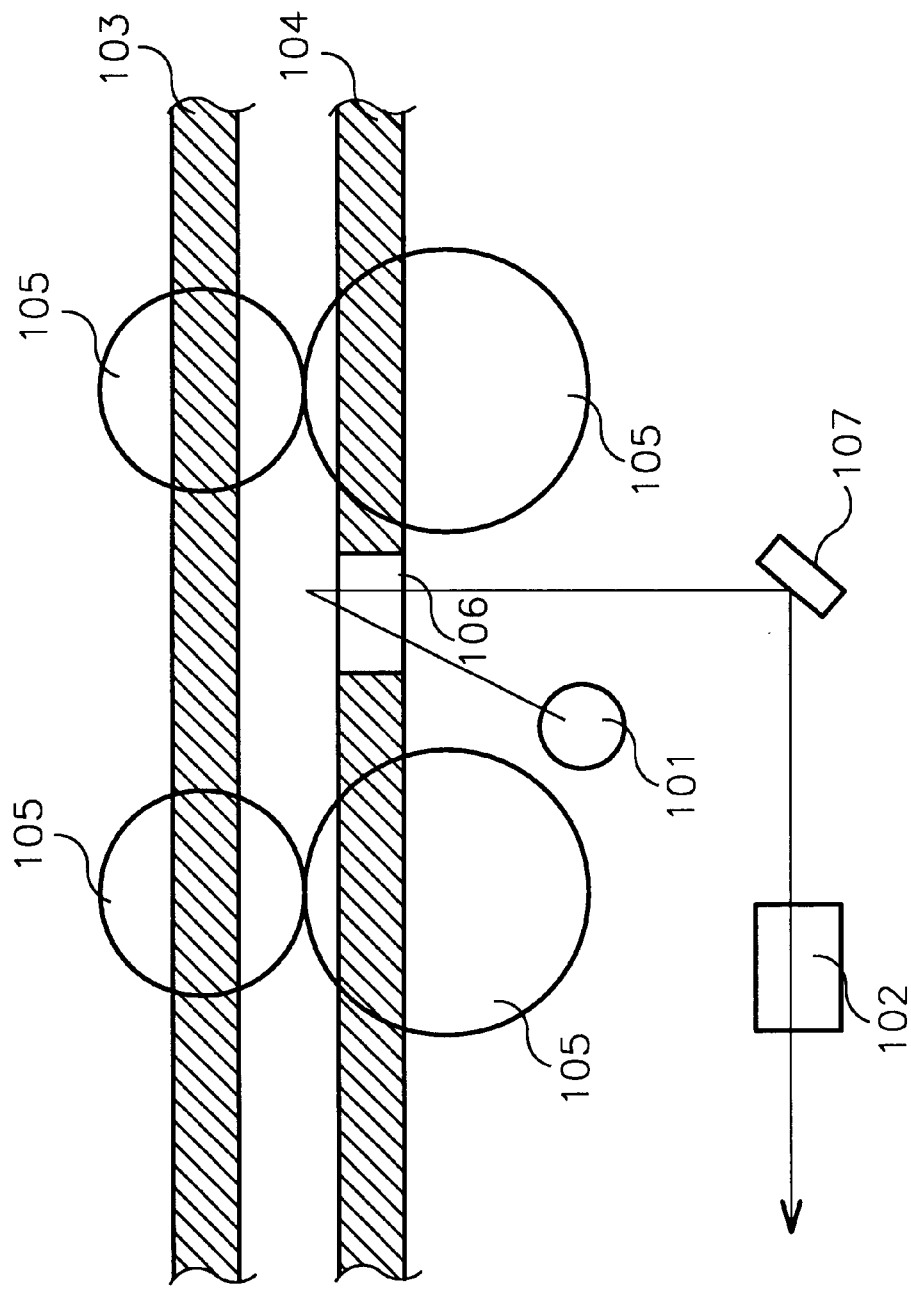
FIG. 1 is a sectional schematic view showing the structure of a paper-driven photo drive.

To simplify the structure of a photo drive, the invention provides a document-tray-driven device which is simple in structure and reliable in application. The elements of the invention is disclosed in FIG. 2. Refer to FIG. 2, the invention is installed in a compact housing 201 which has exactly the same size of a conventional CD ROM driver. In the middle of the housing 201, there is a paper feeding device 202 for feeding a transparent sheet as well as a reflective sheet, such as a 4×6" or 4×5" negative film, a photo, or a name card. The paper feeding device 202 is mounted on a pair of supporting elements 203 which can be implemented as sliding shafts or leader screws for allowing the paper feeding device 202 to move smoothly thereon. The paper feeding device 202 includes a transparent tray cover (not shown) and a transparent document tray 202 for the light beams to emit through.

The motion of the paper feeding device 202 is controlled by a driving device 204. The driving device 204 includes a master gear 2041, a reduction gear 2042, an idle pulley 2043, and a conveying device 2045. The master gear 2041 connects to motor 2046 which controls the rotations of the master gear 2041. The rotation of the master gear 2041 also drives the reduction gear 2042 which further drives idle pulley 2043. The rotation of idle pulley 2043 further drives slave pulley 2044. The slave pulley 2044 and the pulley 2047 are connected to each other via a conveying device 2045 which can be implemented as a conveyor belt or a steel wire rope. When the slave pulley 2044 and the pulley 2047 rotate together, they drive the paper feeding device 202 to move forward or backward in linear direction on the supporting elements 203 with the aid of the guiding shafts 205.

The guiding shafts 205 are installed at the front end of the paper feeding device 202 to stabilize the motion of the paper feeding device 202. At the bottom of the front end of the paper feeding device 202, there is a roller 206 to support and keep the paper feeding device 202 in balance while the paper feeding device 202 is moving back and forth on the supporting elements 203.

To detect the position of the paper feeding device 202, a sensor (not shown) is installed at the bottom of the front end of the paper feeding device 202. Whenever the sensor detects the ends of the paper feeding device 202, it sends control signals to disable or enable the motor 2046.

Since the exposure of the original sheet depends on the motion of the paper feeding device 202, it makes the paper feeding device 202 the only element that is moving for the invention. The other optical members like, the lower illuminating device 207, the upper illuminating device 208, the photoelectric converting device 209, and the mirror 210 are all fixed. The lower illumination device 207 is fixed at the lower half part of the front end of the housing 201 for providing light source for a reflective sheet. The lower illumination device 207 comprises a straight-tube fluorescent lamp 2071, and a reflecting device 2072. The reflective device 2072 is disposed at the bottom of the straight-tube fluorescent lamp 2071 for reflecting the light beams upwards.

Figure 2A:
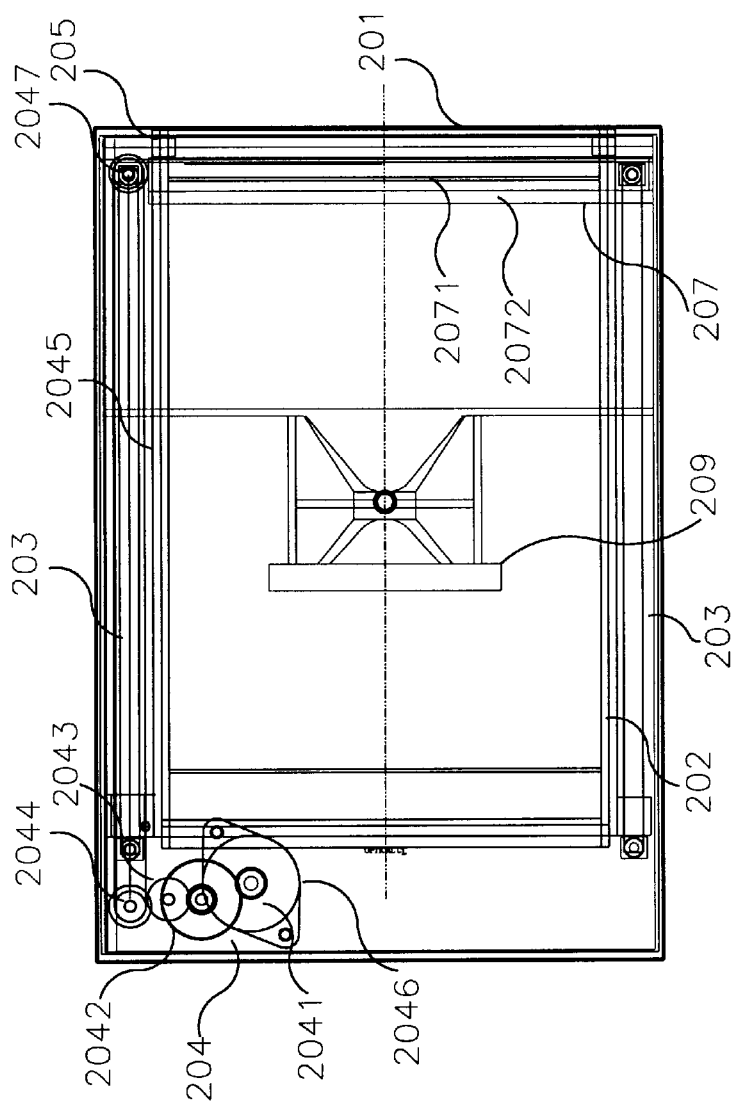
FIG. 2A is a top view of the preferred embodiment of the invention.
Figure 2B:
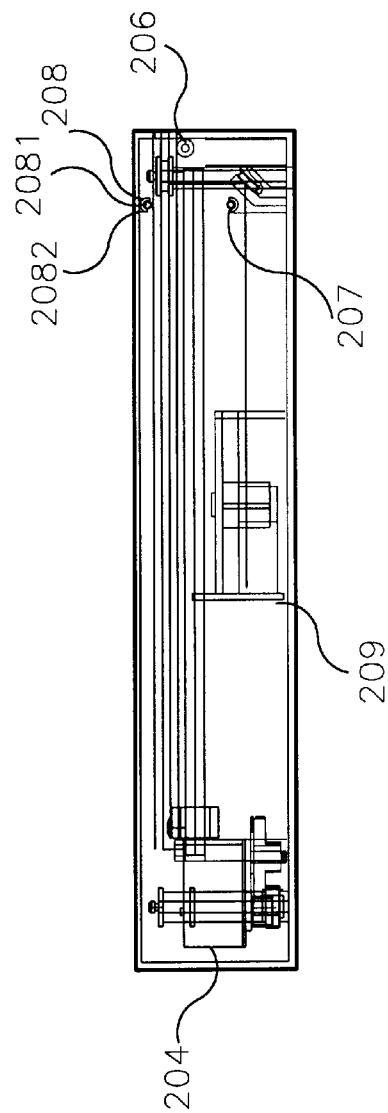
FIG. 2B is a side view of the preferred embodiment of the invention.

Refer to FIG. 2B for the relative positions of the elements disclosed in FIG. 2A. On the upper half of the front end of the housing 201, there is an upper illuminating device 208 for providing light source for a transparent sheet. The upper illuminating device 208 also comprises a straight-tube fluorescent lamp 2081 and a reflecting device 2082. The reflecting device 2082 is disposed on top of the straight-tube fluorescent lamp 2081 for reflecting light beams downwards. The image of the original sheet can be reflected to the photoelectric converting device 209 via mirror 210. The photoelectric converting device 209 can be implemented as a CCD line image sensor or a CIS line image sensor for converting the image information of the original sheet into electric signals.

The operation steps of the invention are described below:
1. Press eject button.
2. When the motor is enabled, the driving device drives the document tray out of the housing.
3. When the document tray reaches its end, the sensor detects and sends a control signal to disable the motor.
4. Put the original sheet on the document tray and cover it properly with the transparent tray cover.
5. Press scan button.
6. The motor is enabled again to drive the document tray back to the housing. The exposure of the original sheet is taken place simultaneously while the original sheet is moving into the housing. When scanning a reflective sheet, the light source comes from the lower illuminating device. When scanning a transparent sheet, the light source comes from the upper illuminating device.
7. When the scanning process is finished, the document tray is driven to its original place. The sensor detects the end of the paper feeding device and sends a control signal to enable motor again. The paper feeding device will be automatically driven out of the housing.
8. When the document tray reaches the end, the sensor sends another control signal to disable motor.
9. Pick the original sheet out of the document tray and then press the eject button again to drive the document tray back to the housing for next time use.

To sum up, the invention can utilize the inner space of the photo drive more efficiently by simplifying the structure of the driving device of the paper feeding device. More importantly, since the main optical members are all fixed on the housing, the quality of the image resolution can be greatly improved thereby. It should be understood that various alternatives to the structures described herein may be employed in practicing the present invention. It is intended that the following claims define the invention and that the structure within the scope of these claims and their equivalents be covered thereby.

What is claimed is:

1. A document-tray-driven apparatus for a photo drive comprising:
   a compact housing having an opening in the middle thereof;
   a paper feeder disposed horizontally in the middle of said housing and mounted on a pair of supports for feeding a transparent sheet or a reflective sheet;
   a driver located at one side of said paper feeder for driving said paper feeder back and forth reciprocally;
   a lower illuminator disposed beneath said paper feeder and fixed at the lower half of the front end of said housing for emitting light beams onto a reflective sheet when placed on said paper feeder;
   an upper illuminator disposed above said paper feeder and fixed at the upper half of the front end of said housing for emitting light beams onto a transparent sheet when placed on said paper feeder; and
   a photoelectric converter mounted beneath said paper feeder and fixed on the inner bottom of said housing for converting said light beams into electric signals.

2. The apparatus as claimed in claim 1, wherein said paper feeder comprises:
   a transparent tray cover; and
   a transparent document tray.

3. The apparatus as claimed in claim 2, further comprising:
   a roller disposed beneath and at the front end of said document tray for supporting said document tray.

4. The apparatus as claimed in claim 1, wherein said driver comprises:
   a motor;
   a plurality of pulleys indirectly rotatable by said motor; and
   a conveyor connected to said paper feeder and said plurality of pulleys for driving said paper feeder.

5. The apparatus as claimed in claim 1, wherein said upper illuminator comprises:
   a straight-tube fluorescent lamp for emitting light beams; and
   a reflector disposed above said straight-tube fluorescent lamp for reflecting said light beams downwards.

6. The apparatus as claimed in claim 1, wherein said lower illuminator comprises:
   a straight-tube fluorescent lamp for emitting light beams; and
   a reflector disposed below said straight-tube fluorescent lamp for reflecting said light beams upwards.

7. The apparatus as claimed in claim 1, wherein said photoelectric converter comprises a CCD line image sensor or a CIS line image sensor.

8. The apparatus as claimed in claim 1, wherein said supports comprise sliding shafts.

9. The apparatus as claimed in claim 1, wherein said supports comprise leader screws.

10. A document-tray-driven apparatus for a photo drive which is housed in a compact housing, comprising:

a document tray disposed horizontally in the middle of said compact housing and mounted on a pair of supports for feeding a transparent sheet or a reflective sheet;

a pair of pulleys located at the same side and at the opposite ends of said document tray;

a conveyor connecting to said document tray and said pair of pulleys for driving said document tray back and forth reciprocally;

a lower illuminator disposed beneath said document tray and fixed at the lower half of the front end of said compact housing for emitting light beams onto a reflective sheet when placed on said document tray;

an upper illuminator disposed above said document tray and fixed at the upper half of the front end of said compact housing for emitting light beams onto a transparent sheet when placed on said document tray; and a photoelectric converter mounted beneath said document tray and fixed on the inner bottom of said compact housing for converting said light beams into electric signals.

11. The apparatus as claimed in claim 10, wherein said upper illuminator comprises:

a straight-tube fluorescent lamp for emitting light beams; and a reflector disposed above said straight-tube fluorescent lamp for reflecting said light beams downwards.

12. The apparatus as claimed in claim 10, wherein said lower illuminator comprises:

a straight-tube fluorescent lamp for emitting light beams; and a reflector disposed below said straight-tube fluorescent lamp for reflecting said light beams upwards.

13. The apparatus as claimed in claim 10, wherein said supports comprise sliding shafts.

14. The apparatus as claimed in claim 10, wherein said supports comprise leader screws.

15. The apparatus as claimed in claim 10, further comprising:

a roller disposed beneath and at the front end of said document tray for supporting said document tray.

16. The apparatus as claimed in claim 10, wherein said conveyor comprises a conveyor belt or a steel wire rope.

* * * * *